No. 896,083. PATENTED AUG. 18, 1908.
J. P. BURNS.
LISTER SWEEP.
APPLICATION FILED NOV. 29, 1907.
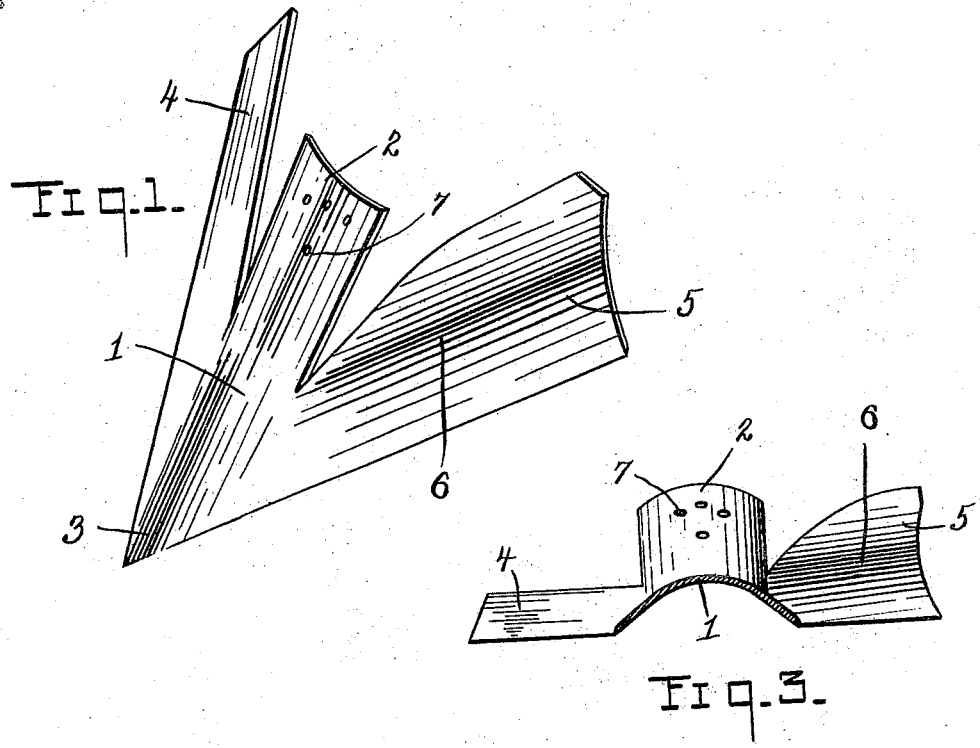
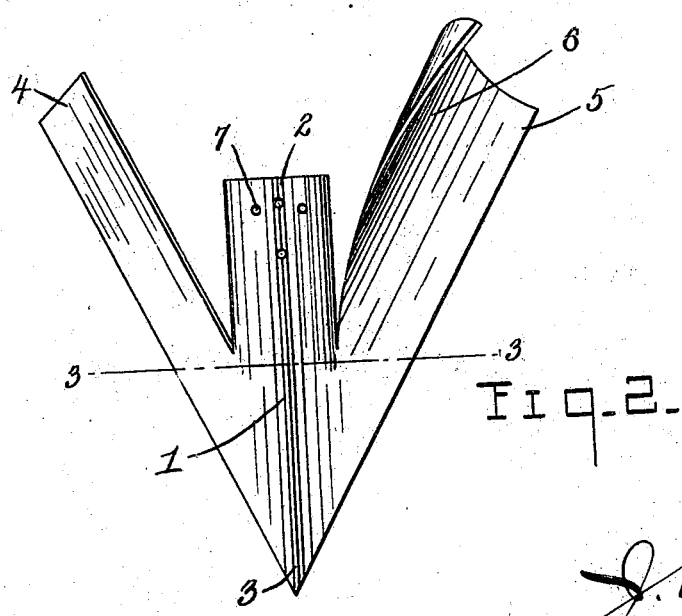

UNITED STATES PATENT OFFICE.

JOHN P. BURNS, OF BULCHER, TEXAS.

LISTER-SWEEP.

No. 896,083.

Specification of Letters Patent.

Patented Aug. 18, 1908.

Application filed November 29, 1907. Serial No. 404,454.

*To all whom it may concern:*

Be it known that I, JOHN P. BURNS, a citizen of the United States, residing at Bulcher, in the county of Cooke and State of Texas, have invented certain new and useful Improvements in Lister-Sweeps, of which the following is a specification, reference being had to the accompanying drawings.

My invention relates to improvements in cultivator teeth and more particularly to sweeps for lister cultivators.

The object of the invention is to provide a simple and inexpensive device of this character which will effectively loosen up the ground between the rows of plants and throw a portion of it up against the latter.

With the above and other objects in view, the invention consists of the novel construction hereinafter described and claimed and illustrated in the accompanying drawings, in which Figure 1 is a perspective view of my improved lister sweep; Fig. 2 is a plan view of the same; and Fig. 3 is a vertical transverse section.

The tooth or sweep is constructed from a single piece of sheet metal and comprises a central body portion 1 terminating at one end in an attaching tongue or shank 2 and at its other end in a V-shaped point 3, and having two blades or wings 4, 5 projecting outwardly and rearwardly from its central portion. The wings 4, 5 converge to the outer end or point 3 of the body of the sweep and their outer edges may be sharpened to more effectively enter the ground and sever the roots of weeds, etc. Both of said wings are inclined in a transverse plane as shown in Fig. 3 so that they loosen and elevate the ground and the wing 4 is preferably comparatively narrow and of the same width from end to end. The other blade or wing 5 is of the same length as the wing 4 but it is considerably broader and is curved transversely as at 6 and has its concave side outermost so that the ground which it elevates will be thrown over and outwardly against the plants. The main portion of the body 1 is curved transversely and has its convex face uppermost so as to form a ridge which throws the ground to either side of the same. The attaching tongue or shank 2 may be of any suitable shape to engage the stock or standard of the cultivator and in it are formed apertures 7 to receive fastening bolts or clamping devices.

In use the sweeps are applied to the standards of a lister cultivator so that the wings or blades 5 of the two adjacent sweeps are innermost and opposed to each other, it being understood that the blades or wings 4, 5 may be arranged upon either side of its body so as to adapt the sweep for use upon either the right or left hand side of the cultivator. When thus mounted and moved through the ground on each side of a row of corn or other plants the point 3 and the edges of the two wings or blades will effectively loosen up the soil and sever the roots of the weeds and the two blades or wings 5 will throw the ground over against the plants as will be readily understood.

Having thus described my invention what I claim is:

The herein described lister sweep comprising a body having at one end an attaching shank and at its other end a V-shaped point, a cutting wing or blade projecting from one side of said point and inclined upwardly and inwardly, said wing or blade being of uniform width and having its bottom cutting edge disposed horizontally and forming a continuation of one edge of the pointed end of the body and a sweep blade or wing projecting from the other side of said point, said sweep wing or blade being broader than the cutter wing or blade and being curved transversely from end to end, the lower edge of said sweep wing or blade being horizontal and forming a continuation of one edge of the pointed end of the body, substantially as set forth.

In testimony whereof I hereunto affix my signature in the presence of two witnesses.

JOHN P. BURNS.

Witnesses:
R. P. HAIR,
C. W. DENNIS.